Feb. 14, 1961

R. O. PETERS ET AL 2,971,409

DRILL CONSTRUCTION

Filed Nov. 17, 1958

INVENTOR.
ROBERT O. PETERS
DANIEL J. SULLIVAN, JR.
BY
ATTORNEYS

United States Patent Office 2,971,409
Patented Feb. 14, 1961

2,971,409

DRILL CONSTRUCTION

Robert O. Peters, Royal Oak, and Daniel J. Sullivan, Jr., Huntington Woods, Mich., assignors to National Twist Drill & Tool Company, Rochester, Okla., a corporation of Michigan Filed Nov. 17, 1958, Ser. No. 774,194

2 Claims. (Cl. 77—68)

This invention pertains to a drill construction wherein a relatively inexpensive drill shank is provided with a separate cutting element and separate guide members of suitable cutting and wear characteristics.

It is an essential object of this invention to provide in a drill construction a drill shank having fixed at the end thereof a cutting element, and guide strips fixed along the shank sides and projecting from the shank sides so as to bear against the wall of the drilled hole to guide the drill in its drilled path, with the cutter element and guide strips being of separate materials than the drill shank, and with the cutting element and guide member materials having suitable cutting and wear characteristics.

Another object of this invention is to provide in a drill construction a coolant carrying tubular shank having fixed at one end thereof a cutting element having a cutting radius greater than the shank radius and having fixed along the sides thereof guide strips projecting radially outwardly to a distance substantially equal to the cutting radius with the guide strips being circumferentially spaced, and with said tubular shank providing a continuous coolant path along the center thereof and across the cutting element sides with coolant and chip return taking place along the outer shank walls and between the circumferentially spaced guide strips.

Another object of this invention is to provide a drill construction having a coolant carrying tubular shank of a relatively inexpensive material having one end thereof slotted across the tubular opening to receive a cutting element with the tubular opening at the cutting end being of a diameter greater than the width of the cutting element so that coolant passing through said shank opening will flow along either side of the cutting element, with the cutting element having a cutting radius greater than the shank radius, and with the tubular shank having circumferentially spaced notches along the outer surface thereof to receive guide strips which radially extend from the outer surface to a distance substantially equal to the cutting radius of the cutter element so that the guide strips will bear against the wall of the drilled hole to guide the drill in its cutting path, and with the cutter element and the guide strips being of a material having suitable cutting and wear characteristics.

These and other objects will become more apparent when a preferred embodiment of my invention is described in connection with the following drawing, in which.

Figure 1:
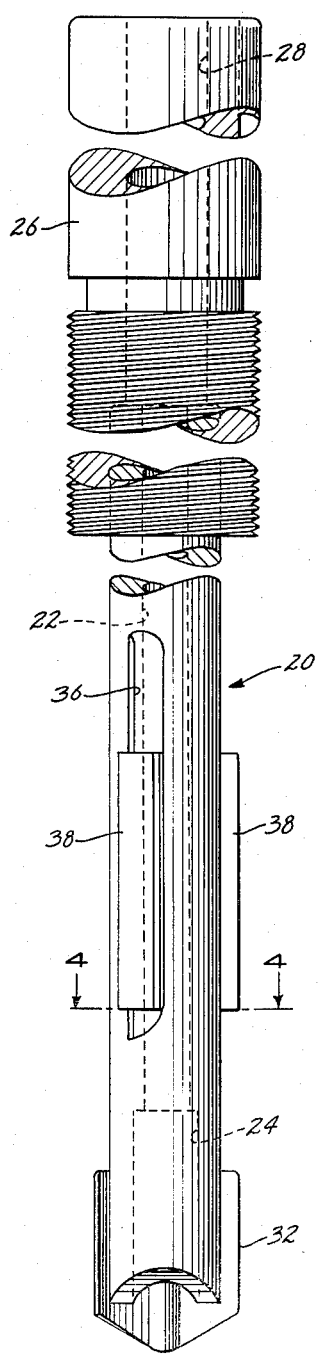
Fig. 1 is a side elevational view of a drill construction of this invention.
Figure 2:
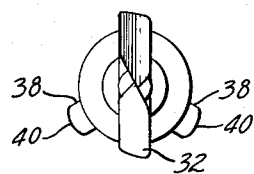
Fig. 2 is an end elevation from the cutting end of the drill construction.
Figure 4:
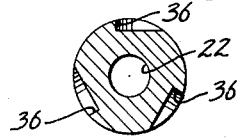
Fig. 4 is a section taken along 4—4 of Fig. 1.
Figure 3:
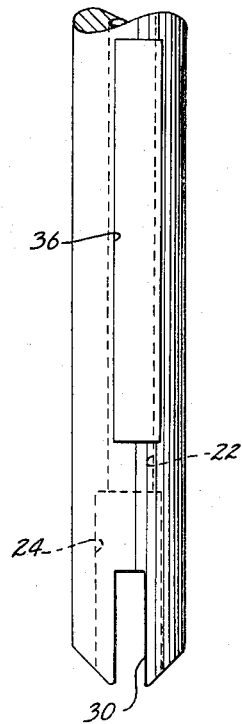
Fig. 3 is a partial plan elevation of the cutting end of the embodiment shown in Fig. 1.

This invention provides a tubular shank of a commercially available relatively inexpensive material having separate cutting and guiding elements fixed thereto, with said elements being of materials having suitable cutting and wear characteristics to provide an economical drill construction especially for drills used in drilling deep holes and having correspondingly long shanks.

In the drawings is seen a drill having a tubular shank 20 with a central coolant passage 22 having an enlarged portion 24 formed at the cutting end thereof. Shank 20 may be formed from a relatively inexpensive commercially available tubular stock.

Attached to one end of shank 20 is a driving attachment 26 having a central opening 28 formed therein which registers with the passage 22. Attachment 26 is adapted for engagement with a driving or power source (not shown). Formed across enlargement 24 at the other end of shank 20 is a transverse slot 30 having a width less than the diameter of enlargement 24. Brazed or otherwise attached in slot 30 is a cutter element 32 which is of a material having suitable hardness and cutting characteristics, such as high speed steel or carbide, and is dimensioned to have a cutting radius exceeding that of the shank radius. The width of element 32 is less than that of enlargement 24 so that coolant flowing in passage 22 and enlargement 24 will engage and flow along opposite sides of element 32 to reduce the temperatures in the cutting area and to carry away chips formed in the cutting operation.

Formed in and along the sides of shank 20 are a plurality of longitudinal, circumferentially spaced notches 36 into which are brazed or otherwise attached guide and wear strips 38 which are of a suitable high wearing material such as high speed steel or carbide. The strips 38 project radially outwardly to a distance substantially equal to the cutting radius and have convexly rounded outer surfaces 40 which are adapted to bear against the wall of the drilled hole to guide the drill in its cutting path to maintain uniform drill alignment. The radial spacing between the shank 20 and the drilled wall and the circumferential spacings between strips 36 provide clearance for return of the chip-carrying coolant flow.

If desired, cutting element 32 and/or guide strips 38 may be removably secured to shank 20.

What we claim as our inventions is:

1. A drilling tool comprising a tubular shank having a central coolant-carrying passage therein, a plurality of longitudinal, circumferentially spaced axial notches intermediate the ends of said shank, said notches being formed in the outer periphery of said shank, each of said notches having only two flat, angularly disposed side wall portions, a transverse slot formed at one end of said shank in the shank wall on opposite sides of said coolant-carrying passage, a separate cutting element fixed in said slot to said one end of said shank and having a cutting radius greater than the radius of said shank, the width of said cutting element being less than the width of said coolant-carrying passage in the cutting element area so that the coolant can flow along the sides of said cutting element, separate guide strips independent of said cutting element received in said axial notches, each of said guide strips including a pair of flat surfaces intersecting at an angle equal to the angle between the wall portions defining said notches and adapted to seat against said wall portions, said guide strips extending radially outwardly from the wall of said shank a distance substantially equal to said cutting element radius whereby said strips will bear against the wall of the hole drilled by said cutting element to guide the drilling tool in its drilled path, the spacing between said guide strips exterior of said shank providing a chip disposal and return coolant path.

2. The drilling tool defined in claim 1 wherein said notches are equally spaced circumferentially and said cutting element lies in the vertical plane of one of said guide strips.

References Cited in the file of this patent

UNITED STATES PATENTS 2,817,983     Mossberg _____ Dec. 21, 1957

FOREIGN PATENTS 767,138     Germany _____ Nov. 8, 1951

UNITED STATES PATENT OFFICE
CERTIFICATION OF CORRECTION

Patent No. 2,971,409                  February 14, 1961

Robert O. Peters et al.

It is hereby certified that error appears in the above numbered patent requiring correction and that the said Letters Patent should read as corrected below.

In the grant, line 3, address of assignee, for "Rochester, Oklahoma" read -- Rochester, Michigan --; in the heading to the printed specification, line 5, for "Rochester, Okla." read -- Rochester, Mich. --.

Signed and sealed this 18th day of July 1961.

(SEAL)
Attest:

ERNEST W. SWIDER                                  DAVID L. LADD
Attesting Officer                                    Commissioner of Patents